United States Patent
Ahouanto et al.

(10) Patent No.: US 6,802,923 B2
(45) Date of Patent: Oct. 12, 2004

(54) PROCESS FOR MANUFACTURING A TIRE

(75) Inventors: Michel Ahouanto, Enval (FR); Luc Bestgen, Chatel-Guyon (FR)

(73) Assignee: Michelin Recherche et Technique SA, Granges Paccot (CH)

( * ) Notice: Subject to any disclaimer, the term of this patent is extended or adjusted under 35 U.S.C. 154(b) by 197 days.

(21) Appl. No.: 10/061,019

(22) Filed: Jan. 30, 2002

(65) Prior Publication Data

US 2002/0096244 A1 Jul. 25, 2002

Related U.S. Application Data

(63) Continuation of application No. PCT/EP00/07067, filed on Jul. 24, 2000.

(30) Foreign Application Priority Data

Aug. 2, 1999 (FR) .............................................. 99 10109

(51) Int. Cl.⁷ .............................................. B29D 30/30
(52) U.S. Cl. .................... 156/130; 156/130.7; 156/132; 156/133; 152/562
(58) Field of Search ................................ 156/133, 130, 156/123, 130.7, 131, 132; 152/562, 528

(56) References Cited

U.S. PATENT DOCUMENTS

| 3,327,753 A | 6/1967 | Travers |
| 3,404,721 A | * 10/1968 | Massoubre ................... 152/527 |
| 3,525,377 A | * 8/1970 | Menell et al. ............... 152/532 |
| 3,568,749 A | * 3/1971 | Menell et al. ............... 152/538 |
| 3,613,763 A | * 10/1971 | Fletcher ....................... 152/527 |
| 5,437,321 A | 8/1995 | Breny |

FOREIGN PATENT DOCUMENTS

| DE | 1729575 | 7/1971 |
| FR | 1413102 | 8/1965 |
| FR | 1508652 | 11/1967 |
| FR | 2178000 | 11/1973 |
| FR | 2784614 | 4/2000 |

* cited by examiner

*Primary Examiner*—Geoffrey L. Knable
(74) *Attorney, Agent, or Firm*—Burns, Doane, Swecker & Mathis, L.L.P.

(57) ABSTRACT

A process for manufacturing, in one stage, a tire comprising a carcass reinforcement (1) which is radial in the sidewalls and oblique radially beneath a crown reinforcement (3), composed of at least two layers (31) and (32) of reinforcement elements (310) and (320) which are crossed from one layer to the next, wherein there is pre-shaped to a diameter $D_1$ and by means of a sleeve of at least one shaping ply N, vulcanized and formed of reinforcement elements forming with the circumferential direction an angle $\alpha_1$, laid on the building drum T of diameter D, at least the central part of a carcass reinforcement ply (1) formed of radial reinforcement elements (10) forming with the circumferential direction an angle $\mp\beta_1$. There is laid on the central part at least one crown ply (31, 32) formed of reinforcement elements (310, 320) oriented relative to the circumferential direction at angles $\pm\gamma_1$ ($\mu\gamma_1$), $\gamma_1$ being little different from $\beta_1$. Shaping is effected by bringing the internal diameter $D_1$ of the cylindrical blank to the internal diameter $D_2$, which is the diameter of the vulcanized tire.

8 Claims, 5 Drawing Sheets

FIG_3

PROCESS FOR MANUFACTURING A TIRE

CROSS REFERENCE TO RELATED APPLICATIONS

This application is a continuation of international application No. PCT/EP 00/07067, which was filed on Jul. 24, 2000, and published in French on Feb. 8, 2001, under number WO 01/08873 A1 and which claims priority of French application No. 99/10109 filed on Aug. 2, 1999.

TECHNICAL FIELD OF THE INVENTION

The present invention relates to a process for manufacturing a tire comprising a carcass reinforcement, the reinforcement elements of which are radial in the sidewalls and oblique to the circumferential direction in the region of the crown reinforcement. It also relates to the tires obtained by said process.

BACKGROUND OF THE INVENTION

Tires of the radial type, and more precisely the non-vulcanized toric blanks thereof, are commonly manufactured by a process comprising two distinct phases. In the first phase, the cylindrical blank of the carcass reinforcement is manufactured on a cylindrical building drum. The blank comprises, inter alia, the carcass reinforcement itself, the rubbers and reinforcements internal to the carcass reinforcement, and all of the elements forming the beads, these elements being the bead wires, the profiled elements and bead filler layers and bead reinforcement armatures. In a second phase, the cylindrical blank of the carcass reinforcement is shaped, dilated to adopt a toric form, on which form there will then be laid the elements constituting the crown reinforcement, the profiled elements and rubber layers separating the crown reinforcement from the carcass reinforcement, as well as the tread. The toric, non-vulcanized tire blank is then introduced into a vulcanization mold, the blank undergoing slight additional shaping to end up with the final dimensions of the tire.

The two-phase manufacturing process for radial tires has for a long time been considered as the only one which can be used industrially, despite the fact that, if compared to the single-phase (or -stage) process used for cross-ply tires, the two-stage process involves additional, more complex, more costly equipment, more labor, and consequently a necessarily higher cost price.

That is why it has always been considered advantageous to be able to manufacture radial tires by a single-stage process and using the traditional equipment for manufacturing cross-ply tires. Such single-stage process consists of assembling, on one and the same drum, all of the constituents of the tire blank in a practically cylindrical shape.

To the extent that the reinforcement elements of the carcass reinforcement are elements which are radial over the entire meridian length and that the crossed reinforcement elements of the crown reinforcement create a triangulation with the elements of the carcass reinforcement, the shaping of the cylindrical blank to arrive at a toric blank is practically impossible, unless a certain number of tricks are used such as lubricating the different layers and/or plies by means, for example, of zinc stearate in powdered form or in solution in a solvent, or the laying between the carcass reinforcement and the crown reinforcement of a large pad of rubber mix. These tricks having more drawbacks than advantages.

French Patent 1 413 102, noting that the portion of the radial carcass reinforcement located radially to the inside of the crown reinforcement might be superfluous, describes a tire comprising a carcass reinforcement anchored in each bead to an inextensible annular element and formed of independent reinforcement elements. The independent reinforcement elements are arranged, firstly, radially or substantially radially between the bead and the crown reinforcement and, secondly, with an orientation which moves substantially away from the radial orientation over at least an axial portion of the region in which the crown reinforcement extends. The carcass reinforcement is finished off by a crown reinforcement, and the simplest solution consists in having a crown reinforcement composed of a single crown ply formed of reinforcement elements, the angle of orientation of which relative to the circumferential direction is of a sign opposite to that formed by the elements of the carcass reinforcement in its oblique portion. Such a tire structure can be produced by the one-stage manufacturing process. The carcass ply is arranged on a building drum, the radial reinforcement elements of the carcass ply being placed substantially parallel to the generatrices of the drum. The bead wires are then put in place and the edges of the carcass ply are turned up around the bead wires and bead filler rubbers to form the carcass ply upturns. Then the crown ply is laid, the direction of the crown reinforcement elements forming a suitable angle with those of the carcass ply, and the two plies, carcass and crown, are caused to adhere. Then the cylindrical blank thus obtained is shaped by bringing together the bead wires and inflating the membrane of the building drum. The reinforcement elements of the carcass ply and those of the crown ply adopt a new angular configuration depending on the starting angles and the shaping ratio in the zone where the two plies are superposed, whereas the carcass ply elements substantially retain their radial orientation in the sidewalls.

Although the foregoing process can effectively make it possible to obtain blanks having a plurality of carcass reinforcement plies and a plurality of crown reinforcement plies, the reinforcement elements of the plies can only have two angular orientations $(-\beta, +\gamma)$ or $(+\beta, -\gamma)$ at the crown, without such orientations being identical $(\beta \neq \gamma)$. The process, therefore, does not make it possible, firstly, to obtain a tire having a single crown ply which is exempt from excessive lateral thrust at 0° drift, and, secondly, to have a tire which is effective in all travelling configurations, owing to the fact that the orientation of the elements of the different plies does not result in the creation of the slightest axial zone with the presence of a triangulated reinforcement. It is true that the cited reference proposes a solution for overcoming the last-mentioned disadvantages, i.e., it is possible to add to the structure described another crown ply, the reinforcement elements of which have an orientation of a sign which is opposite to that of the reinforcement elements of the first ply. The laying of the second crown ply, however, is only effected, according to the process described, in a second stage after shaping to the final diameter of the toric blank, that is to say, a process identical to the process for manufacturing a blank having a true triangulated reinforcement.

SUMMARY OF THE INVENTION

It is an object of the invention to overcome the foregoing disadvantages and to provide a tire produced by a process very close to a one-stage process, and which makes it possible to obtain either a tire having a crown ply, the reinforcement elements of which form the angle opposite to that of the elements of the radially subjacent carcass with the circumferential direction, or a tire having a crown reinforcement with plies of reinforcement elements which are crossed from one ply to the next, or a tire having a partially triangulated crown reinforcement.

According to the invention, a process for manufacturing a tire comprising a carcass reinforcement which is radial in the sidewalls and the reinforcement elements of which form with the circumferential direction and radially beneath a crown reinforcement, which is composed of at least one layer of reinforcement elements forming an angle $\perp\gamma_2$ with said direction, an angle $\mp\beta_2$ over a width L, includes initially manufacturing a cylindrical blank comprising all of the components of the tire by at least the following steps:

a) at least one carcass reinforcement ply formed of radial reinforcement elements is laid on the central part of diameter D of a cylindrical building drum;

b) the annular bead elements, which are inextensible and have an internal diameter $D_3$, the profiled elements and bead filler rubbers, the bead reinforcement armatures, are laid, and the edges of the carcass ply are turned up to form the carcass upturns;

c) the central part of the carcass ply is subjected to an angular variation of its reinforcement elements by pre-shaping on the drum, passing from the diameter D to a greater diameter $D_1$, such that the radial elements become oblique, forming with the circumferential direction an angle $\mp\beta_1$, such angular variation of the carcass ply on the width L being effected by means of at least one auxiliary ply N of width $L_0$, referred to as a shaping ply, which is formed of textile or metallic elements coated in a vulcanized rubber mix and laid on the building drum for the cylindrical tire blank;

d) the profiled elements and rubber layers are laid between the carcass reinforcement and crown reinforcement, then radially to the outside at least one crown ply formed of reinforcement elements oriented relative to the circumferential direction by the angles $\pm\gamma_1 \mp\gamma_1$), $\gamma_1$ being such that $|\gamma_1|-|\beta_1| \leq 7°$;

e) it is finished by laying the rubber mixes of the tread and it is shaped by bringing the internal diameter $D_1$ of the cylindrical blank to the internal diameter $D_2$, which is the diameter of the toric blank of the tire in the vulcanization mold and of the vulcanized tire.

The diameter $D_1$ is, firstly, greater than the diameter D of the building drum and, secondly, is between 0.95 times and 1.3 times the internal diameter $D_3$ of the annular bead elements. The angular variation of the carcass ply over the width L is effected by means of at least one auxiliary ply of width $L_0$, the reinforcement elements of which form an angle $\pm\alpha$ with the circumferential direction.

Preferably, the angular variation of the radial carcass reinforcement will be effected by means of a cylindrical sleeve which is vulcanized and formed of two auxiliary plies, the reinforcement elements of which form angles equal respectively to 90° and $\pm\alpha$ or $\pm\alpha$ and 90° with the circumferential direction.

Advantageously, the crown ply (plies) laid on the diameter $D_1$ will have a width (widths) $L_{311}$ and ($L_{322}$) greater than the width $L_1$ of the ply for shaping to the diameter. The tire thus obtained by a process which can be called a one-stage process has the advantage of having a carcass reinforcement which is radial in the sidewalls and oblique radially beneath the crown reinforcement, having beneath the edges of the reinforcement an obliqueness which is variable and increases axially towards the edges of the reinforcement over an axial width $L_{322}$-$L_1$, which makes it possible, in the case of a crown reinforcement having two plies and for said axial width, to obtain triangulation of the two edges of the reinforcement which is beneficial to the performance of the tire during travel.

The performances will be improved if the two crown plies of width $L_{31}$ and $L_{32}$ are preferably replaced by a single ply of elements which are oriented at the angle $\pm\gamma_1$ and of width $L_{11}$, and the edges of which are turned up on themselves, the presence of the upturn being sufficient to create triangulation on the edges of the crown reinforcement and furthermore providing, as is known per se, additional rigidity to said edges.

BRIEF DESCRIPTION OF THE DRAWINGS

The characteristics of the invention will be better understood with reference to the following description, taken together with the accompanying drawings which illustrate examples of embodiments in a non-limitative manner, and in which:

FIGS. 3 to 5 show diagrams, in meridian section, of the different stages of laying the reinforcements on the drum in chronological order;

FIGS. 3A to 5A show, in plan view, the different reinforcements at the different stages shown in FIGS. 3 to 5, respectively.

DESCRIPTION OF EXEMPLARY EMBODIMENT

Figure 1:
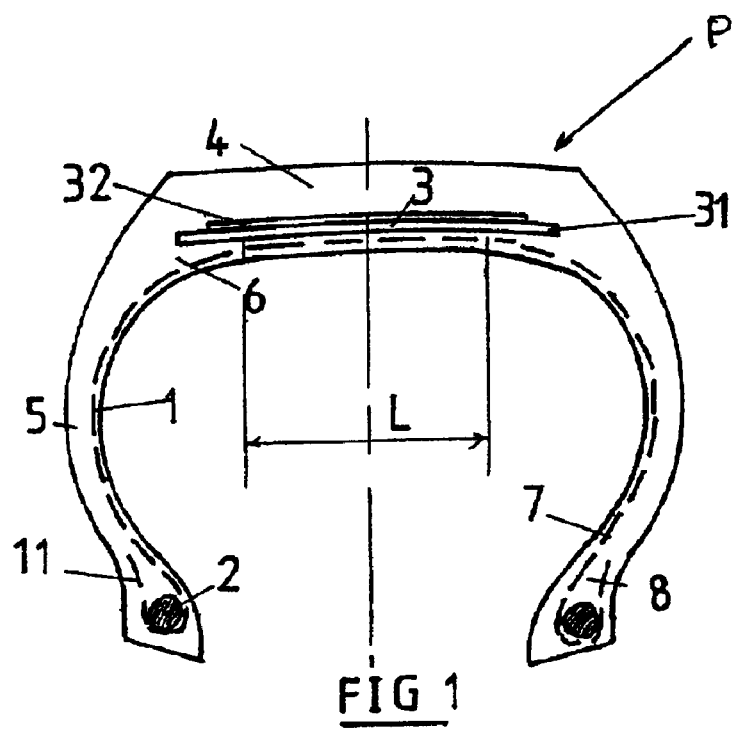
FIG. 1 is a diagram, viewed in meridian section, of a first tire embodiment according to the invention, vulcanized as it is in the vulcanization mold.

As shown in FIG. 1, the tire P is a small-dimension 175/70 R 13 tire comprising a radial carcass reinforcement 1, anchored within each bead 7 to a bead wire 2 to form an upturn 11, which is separated axially from the carcass reinforcement itself by the conventional profiled elements 8 of rubber mixes. The carcass reinforcement 1 is composed, in the case described, of a ply of polyester reinforcement elements, which is surmounted radially by a crown reinforcement 3, composed of two plies 31 and 32 formed of metal cables which are parallel to each other within each ply and crossed from one ply to the next, and are of respective widths $L_{31}$ and $L_{32}$ (see FIG. 2). Since the crown ply 31 closest to the axis of rotation does not have the same curvature as the subjacent portion of carcass ply, the edges of the crown ply $L_{31}$ are joined to the carcass ply by profiled elements 6 of substantially triangular shape. The tire P also comprises two sidewalls 5 joining a tread 4 to the two beads 7, and to the inside the conventional rubber inner coating layer(s) (not shown).

Figure 2:
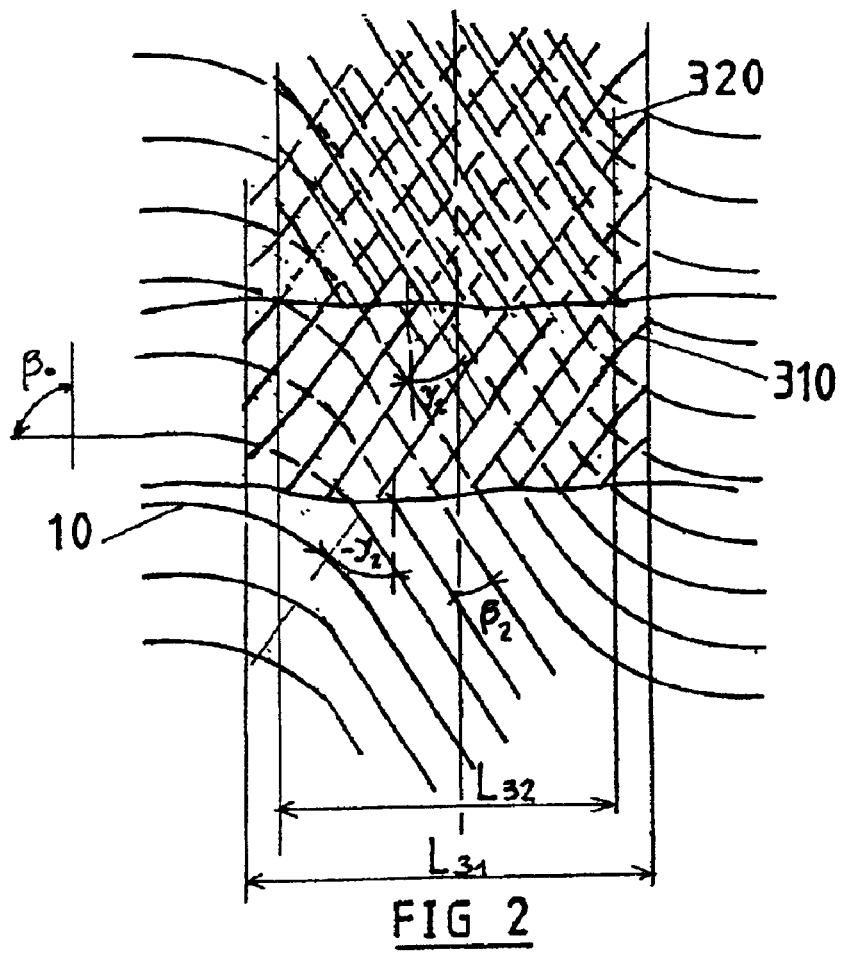
FIG. 2 is a diagram, in a plan view from above, of the different reinforcement elements of the tire of FIG. 1.

As shown in FIG. 2, the reinforcement elements 10 of the carcass ply 1 are firstly oriented radially in the sidewalls 5 and the beads 7, that is to say at an angle $\beta_0$ substantially equal to 90° relative to the circumferential direction of the tire. (By convention, "radial orientation" is to be understood to mean an orientation which may differ by $\pm15°$ relative to the radial direction.) Secondly, the reinforcement elements 10 are oriented radially beneath the crown reinforcement 3 at an angle $-\beta_2$ which is practically constant over the width L, viewed in meridian section, of the zone of parallelism between the carcass ply 1 and the radially adjacent crown ply 31. Outside the zone of parallelism and extending towards the edges of the crown ply 31, over a certain width $L_{31}$–L, the angle $\beta_2$ increases on either side of the equatorial plane, until it becomes equal to $\beta_0$ at the end of the ply 31.

As also shown in FIG. 2, the reinforcement elements 310 and 320 of the crown plies 31 and 32 form with the circumferential direction angles $+\gamma_2$ and $-\gamma_2$, respectively (the minus sign is used to indicate the opposite direction). The angles $+\gamma_2$ and $-\gamma_2$ are constant over the width L previously defined and increase slightly towards the edges of each crown ply, said angles being equal to each other in absolute value and equal to $\beta_2$ to within 3°.

Figure 3A:
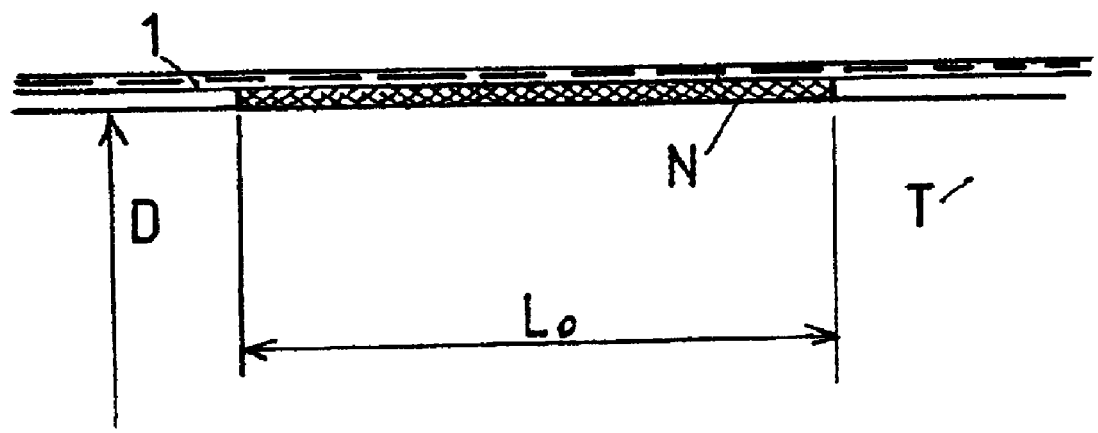
Figure 3A:
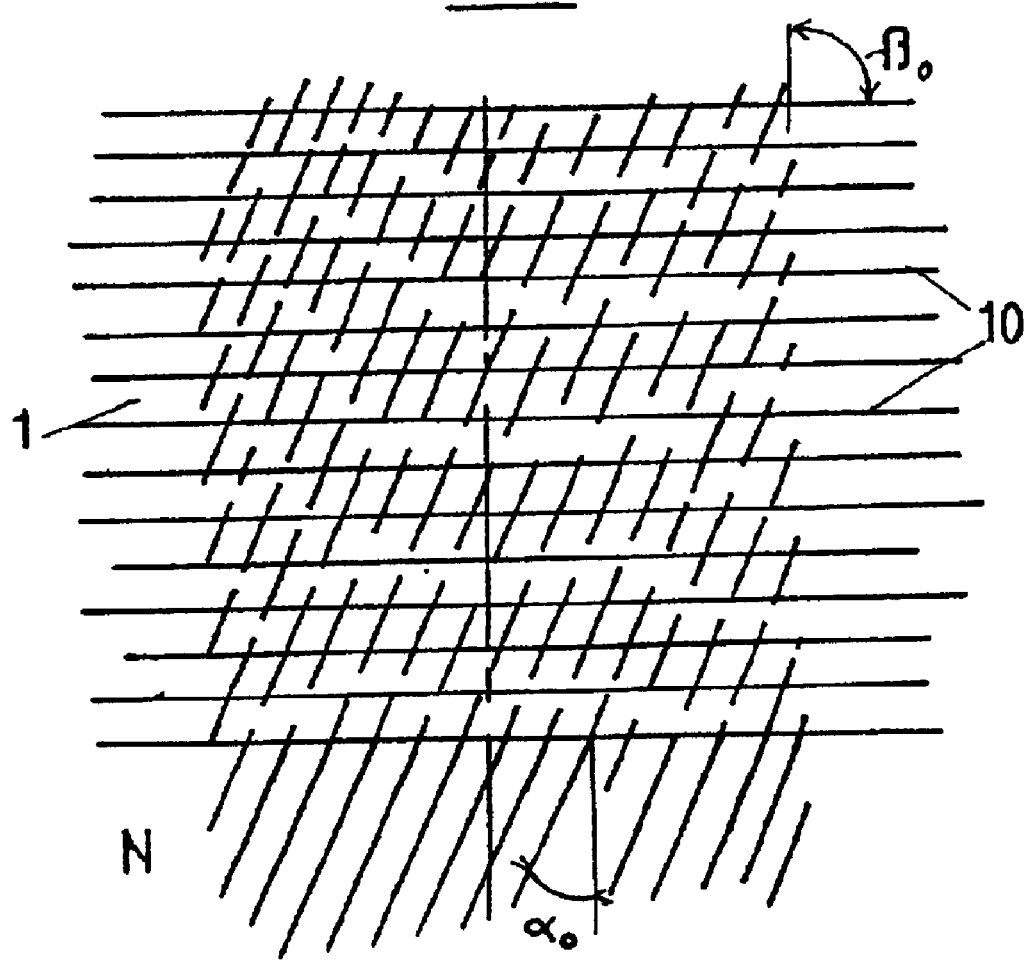

The tire described above comes from the vulcanization of a toric tire blank obtained in a vulcanization mold by shaping a cylindrical tire blank prepared on a cylindrical building drum T (see FIG. 3). The first stage of the manufacturing process consists in laying on the drum T, of circumference $\pi D$, an auxiliary ply N, referred to as a shaping ply. The auxiliary ply N is vulcanized and formed of reinforcement elements of aromatic polyamide, which form with the circumferential direction an angle $\alpha_0$ (see FIG. 3A), equal in the embodiment shown to 9°, and coated on the two faces thereof with a vulcanized rubber mix of low secant modulus of extension, e.g., substantially equal to 3 MPa, measured for a relative elongation of 10%. The cylindrical shaping ply N has a width $L_0$. Radially above, there is laid on the ply N the carcass ply 1 with its radial elements 10, taking the necessary precautions for there to be adhesion over the width $L_0$ between the shaping ply N and the carcass ply 1. The use of a sleeve of two vulcanized auxiliary plies, the reinforcement elements of which would form angles of 90° and 9° with the circumferential direction, has the advantage, compared with the use of a single shaping ply, of not requiring any adhesion between the sleeve and the carcass ply, the contact pressure between the two plies being sufficient to impart the desired angular variation to the carcass ply.

Figure 4:
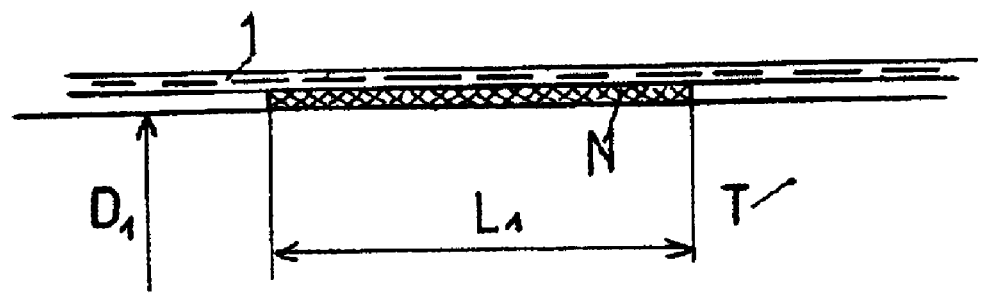
Figure 4A:
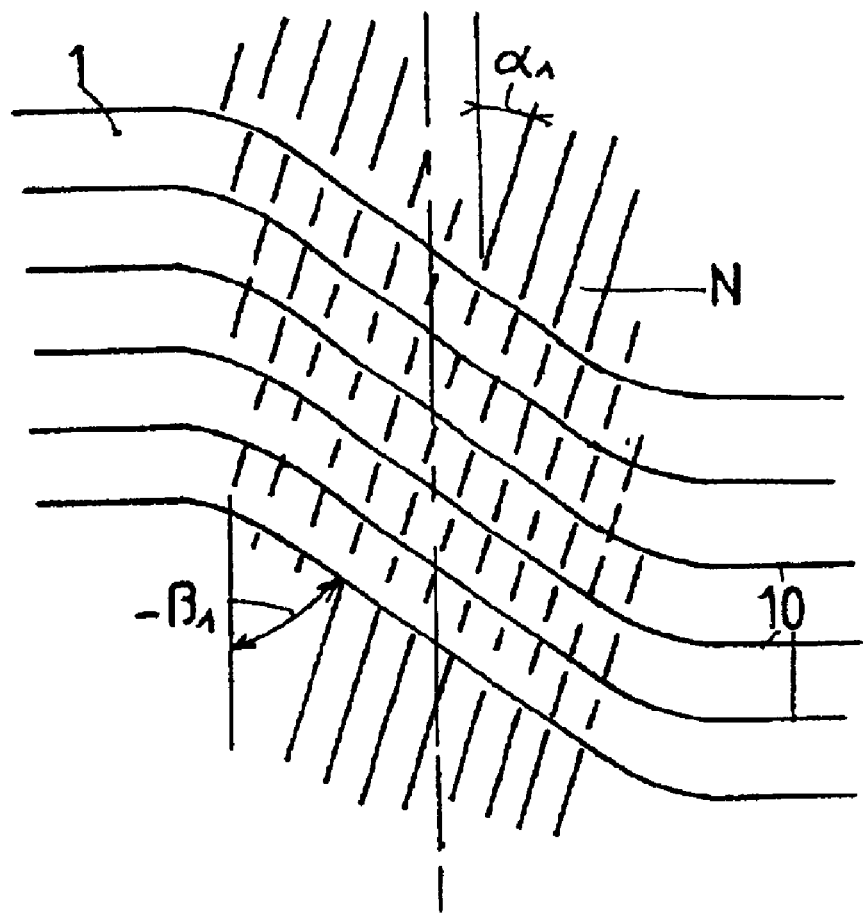

In the second stage of the process, the diameter of the drum, in its central section, is increases from the value D to the value $D_1$, equal to 1.1 D (see FIGS. 4 and 4A). By making the carcass ply 1 adhere to its radial reinforcement elements and the ply N, which is less wide, and with its oblique reinforcement elements, after extension in the circumferential direction, caused by the increase in diameter of the drum, there is obtained a change in the angles formed with the circumferential direction by the reinforcement elements of the two plies, in that section where the two plies adhere, whereas the angle is not changed in that part where only the carcass ply 1 is present. Upon this pre-shaping, the axial width $L_0$ of the shaping ply N decreases to $L_1$ (see FIG. 4). As shown in FIG. 4A, the elements of the ply N retain the same orientation, but the angle $\alpha_0$ decreases to $\alpha_1$, whereas the elements 10 of the carcass ply, in the major part of the width $L_1$, where there is adhesion, are oriented in the opposite direction to form an angle $-\beta_1$. The values of the angles $\alpha_1$ and $\beta_1$ will obviously depend on the starting values, and the amount of the circumferential extension $\tau$. Such values may be calculated approximately by the formulae:

$$\cos \alpha_1 = \frac{\sin(\beta_0 + \alpha_0) + \sin(\beta_0 - \alpha_0)\tau^2}{2\tau \sin \beta_0} \quad \text{Eq. (1)}$$

with $0 < \alpha_0 < \beta_0 < 180°$ $$\text{and} \quad \frac{\sin \beta_1}{\sin \beta_0} = \frac{\sin \alpha_1}{\sin \alpha_0} \quad \text{Eq. (2)}$$

Figure 5:
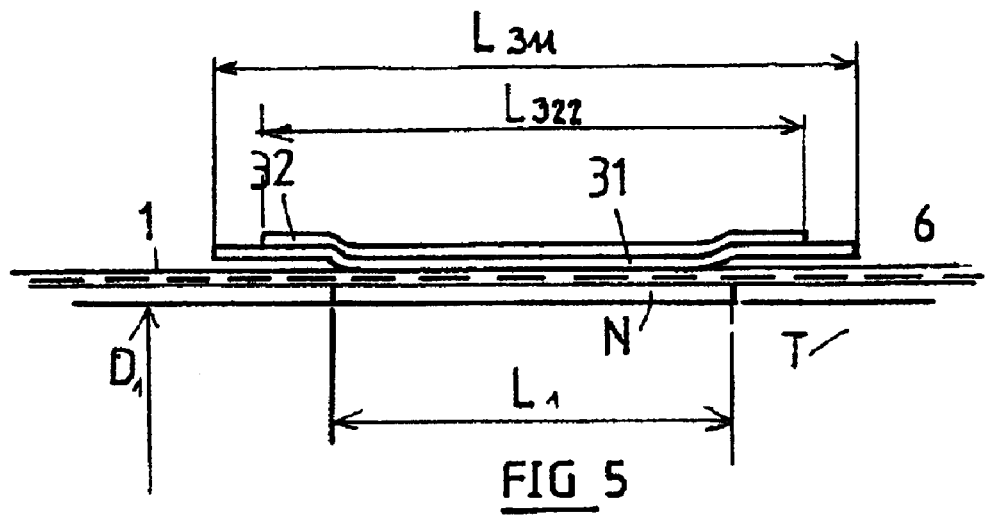
Figure 5A:
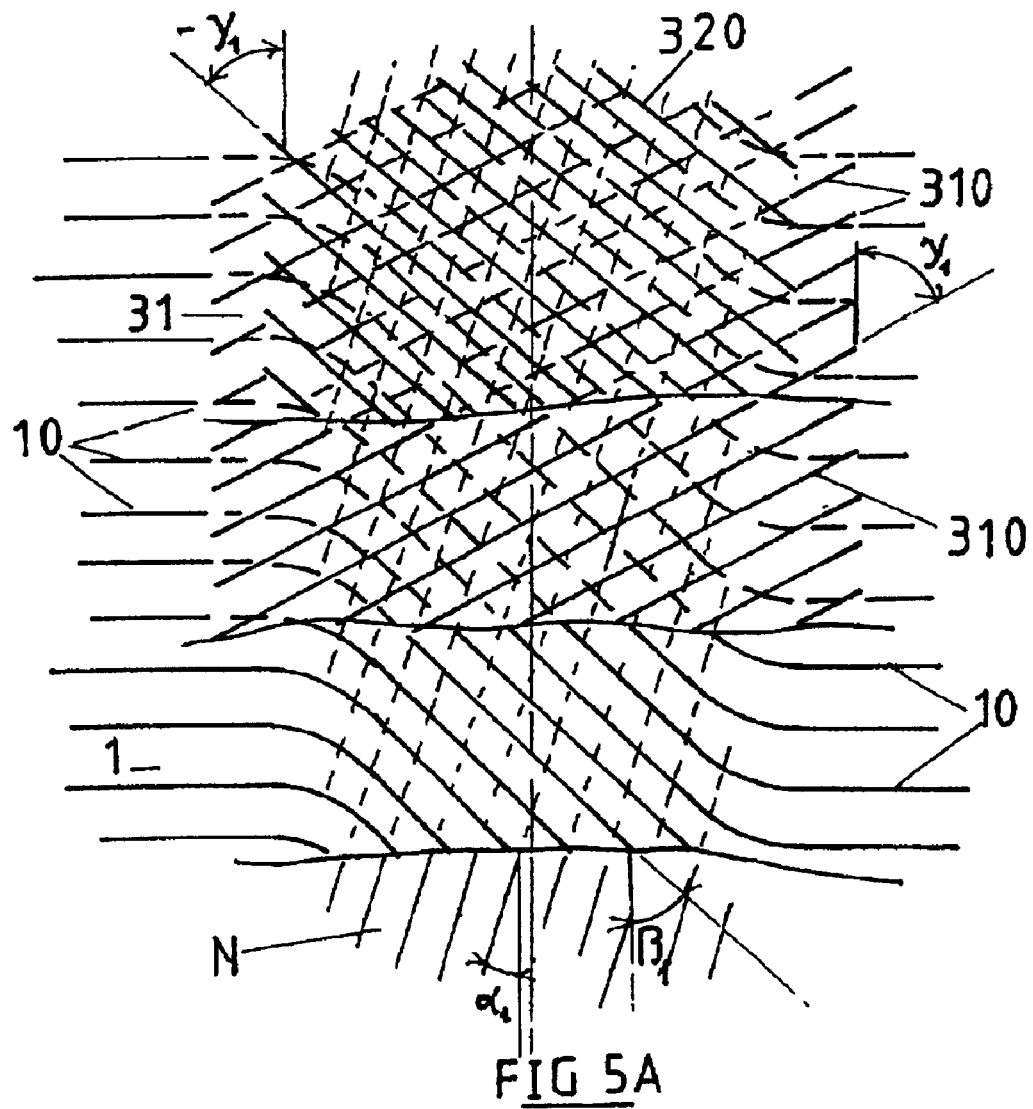

FIG. 5 illustrates the third stage of the process, which consists in laying on the drum T at the diameter $D_1$, firstly, the profiled elements 6 for separation between the edges of the crown plies 31, 32 and the carcass ply 1, and, secondly, the crown plies 31, 32 themselves, the carcass ply always adhering perfectly to the shaping ply N. As shown in FIG. 5A, the reinforcement elements 310, 320 of the two crown plies 31, 32, crossed from one ply 31 to the next 32, form with the circumferential direction angles $\gamma_1$ and $-\gamma_1$, respectively, the absolute values of which are equal to the value of $\beta_1$. The axial widths $L_{311}$ and $L_{322}$ of the two plies 31 and 32, respectively, are greater than the width $L_1$ of the zone of adhesion between the shaping ply N and the carcass ply 1 by an amount less than 80% of the width $L_1$, and in the embodiment shown equal to 53% of $L_1$. The two widths $L_{311}$ and $L_{322}$ differ from each other by an amount which may vary between 0% and 10% of the larger width, for example $L_{311}$.

After the laying of the tread 4 and of all the layers of rubber necessary for finishing the building of the tire, the fourth stage then consists in disengaging the tire blank, which has just been produced, from the shaping ply N. This is done by bringing the building drum T back to the diameter D, the adhesion between the vulcanized ply N and the non-vulcanized carcass ply being sufficient to obtain the desired angular modification, but not sufficiently high to prevent separation between the two plies.

The cylindrical tire blank is then laid in a suitable vulcanization mold. The blank is then expanded to a diameter $D_2$ which is the internal diameter, measured in the equatorial plane, of the vulcanized tire. The carcass ply 1 and the crown plies 31 and 32 are subjected to circumferential extension which results in modification of the angles of their respective reinforcement elements: the angles $-\beta_1$, $+\gamma_1$, $-\gamma_1$ become $\beta_2$, $+\gamma_2$, $-\gamma_2$. In the example embodiment described, the values of the different angles are summarized in the table below:

| | | |
|---|---|---|
| $+\alpha_0 = 9°$ | $+\alpha_1 = 8.6°$ | |
| $\beta_0 = 90°$ | $-\beta_1 = 56°$ | $-\beta_2 = 22°$ |
| | $+\gamma_1 = 54°$ | $+\gamma_2 = 20°$ |
| | $-\gamma_1 = 54°$ | $-\gamma_2 = 20°$ |

Also, the axial widths $L_{311}$ and $L_{322}$, become respectively $L_{31}$ and $L_{32}$ and the width of adhesion $L_1$ becomes substantially the width L of the zone of parallelism between the carcass ply 1 and crown reinforcement 3. Outside the zone of parallelism, and owing to the fact that the widths $L_{311}$ and $L_{322}$ have been selected to be greater than $L_1$, there is formed a triangulation between the reinforcement elements 10 of the carcass ply 1, which have an orientation very close to 90°, and the reinforcement elements of the edges of the crown plies 31 and 32, which form with the circumferential direction angles greater than $+\gamma_2$ and $-\gamma_2$ of variable quantity of approximately between 0° and 20°. Since the axial width of this triangulated part is moderate, the shaping of the tire at its final development is in no way hindered.

Figure 6A:
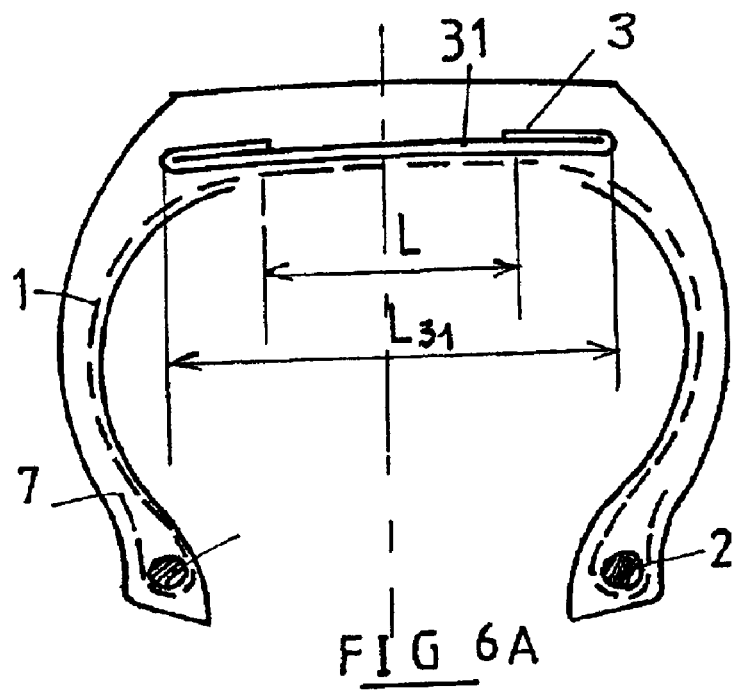
FIGS. 6A and 6B show, viewed in meridian section and in plan view, a second embodiment of a tire according to the invention.
Figure 6B:
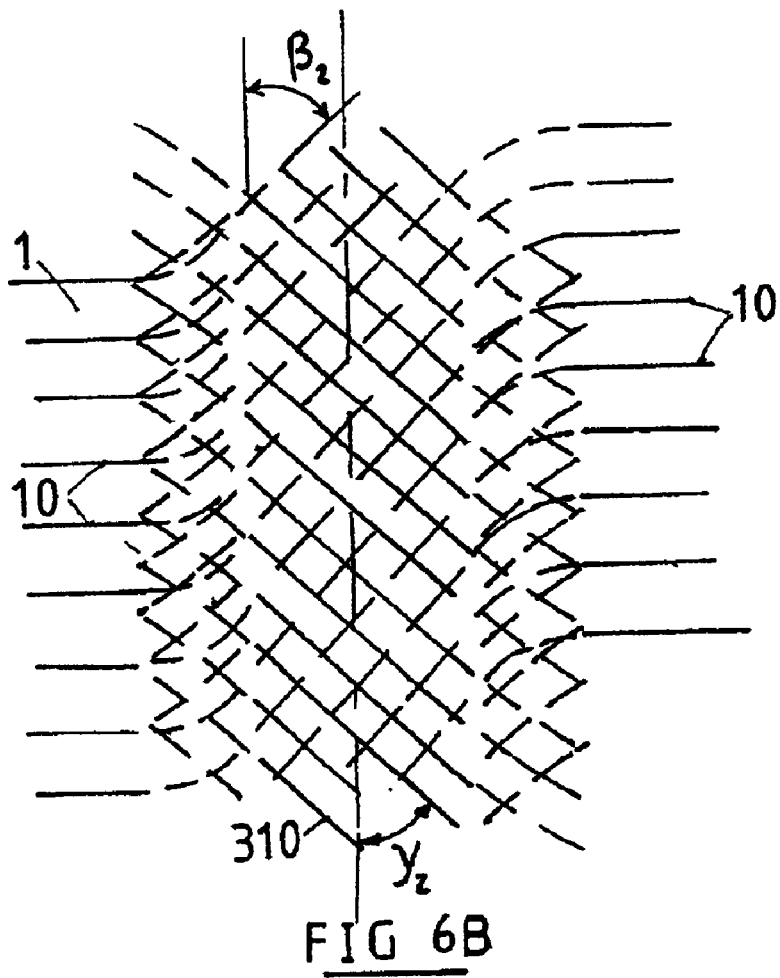

FIGS. 6A and 6B show, viewed in meridian section and in plan view, a second embodiment of a tire which can be manufactured by the process described above. Such tire, like the previous one, comprises a carcass reinforcement 1 anchored within each bead 7 to an inextensible annular element 2 and formed of independent reinforcement elements 10, arranged, firstly, radially or substantially radially between the bead 7 and the crown of the tire and, secondly, with an orientation $\mp \beta_2$, relative to the circumferential direction, over at least the axial width L of the zone of parallelism between the carcass reinforcement 1 and a crown reinforcement 3. The crown reinforcement 3 is composed of a single crown ply 31, formed of reinforcement elements 310, which form with the circumferential direction an angle equal to $\mp \gamma_2$. The ply 31 has edges which are turned up on themselves, with the axial distance between the upturns $L_{31}$ being greater than the width L.

What is claimed is:

1. A process for manufacturing a tire comprising a carcass reinforcement which is radial in the sidewalls and the reinforcement elements of which form with the circumferential direction and radially beneath a crown reinforcement which is composed of at least one layer of radial reinforcement elements forming an angle $\pm y_2$ with said direction, an angle $\mp \beta_2$, the tire also comprising annular bead elements, bead profiled elements, bead filler rubbers, bead reinforcement armatures, crown profiled elements, rubber layers between the carcass reinforcement and the crown reinforcement, and a tread comprising a rubber mix(es) over the crown reinforcement, including initially manufacturing a cylindrical blank comprising all the components of the tire, by at least the following steps:

a) laying at least one carcass reinforcement ply formed of radial reinforcement elements on the central part of diameter D of a cylindrical building drum;

b) laying the annular bead elements, which are inextensible and have an internal diameter $D_3$, the bead profiled elements and bead filler rubbers, and the bead reinforcement armatures, and turning up the edges of the carcass reinforcement ply to form carcass upturns;

c) subjecting the central part of said carcass reinforcement ply to an angular variation of its radial reinforcement elements by pre-shaping on said building drum, by increasing the diameter D to a greater diameter $D_1$, such that said radial reinforcement elements become oblique and form with the circumferential direction an angle $\pm \beta_1$, said angular variation of the carcass reinforcement ply over a width L being effected by means of a sleeve comprising at least one auxiliary shaping ply N of width $L_0$, which is formed of textile or metallic elements coated in a vulcanized rubber mix and laid on the building drum T for the cylindrical tire blank;

d) laying the crown profiled elements and rubber layers between the carcass reinforcement and the crown reinforcement, then radially to the outside laying at least one crown ply formed of reinforcement elements oriented relative to the circumferential direction respectively by an angle $\pm y_1$ wherein $|Y_1|-|\beta_1| \leq 7°$; and e) laying the rubber mix(es) of the tread and shaping the cylindrical blank by bringing the internal diameter $D_1$ thereof to the internal diameter $D_2$ of the toric blank of the tire in the vulcanization mold and of the vulcanized tire.

2. A process according to claim 1, wherein the diameter $D_1$ is between 0.95 times and 1.3 times the internal diameter $D_3$ of the annular bead elements.

3. A process according to claim 1, wherein the angular variation of the radial carcass reinforcement is effected by means of a cylindrical sleeve which is vulcanized and formed of two auxiliary plies N, the reinforcement elements of which form angles equal respectively to 90° and +α with the circumferential direction.

4. A process according to claim 1, wherein the at least one crown ply laid on the diameter $D_1$ has a width greater than a width $L_1$ of the shaping ply N obtained by increasing the diameter D of the building drum to the greater diameter $D_1$.

5. The process according to claim 1 wherein the at least one crown ply comprises a plurality of crown plies, wherein the reinforcement elements are crossed from one crown ply to the next.

6. The process according to claim 1 wherein the angular variation of the radial carcass reinforcement is effected by means of a cylindrical sleeve which is vulcanized and formed of two auxiliary plies N, the reinforcement elements of which form angles equal respectively to +α and 90° with the circumferential direction.

7. The process according to claim 1 wherein the angular variation of the radial carcass reinforcement is effected by means of a cylindrical sleeve which is vulcanized and formed of two auxiliary plies N, the reinforcement elements of which form angles equal respectively to +α and 90° with the circumferential direction.

8. The process according to claim 1 wherein angular variation of the radial carcass reinforcement is effected by means of a cylindrical sleeve which is vulcanized and formed of two auxiliary plies N, the reinforcement elements of which form angles equal respectively to 90° and −α with the circumferential direction.

* * * * *